(12) United States Patent
Bueide

(10) Patent No.: US 7,637,805 B1
(45) Date of Patent: Dec. 29, 2009

(54) APPARATUS FOR REORIENTING FISH FILLETS DURING PROCESSING

(75) Inventor: Einar Bueide, 24204 45th Ave. West, Mountlake Terrace, WA (US) 98043

(73) Assignee: Einar Bueide, Mountlake Terrace, WA (US)

( * ) Notice: Subject to any disclaimer, the term of this patent is extended or adjusted under 35 U.S.C. 154(b) by 0 days.

(21) Appl. No.: 12/419,236

(22) Filed: Apr. 6, 2009

(51) Int. Cl.
*A22C 25/12* (2006.01)
(52) U.S. Cl. .................................... 452/179
(58) Field of Classification Search ............. 452/150, 452/155, 160–164; 198/400, 411, 412
See application file for complete search history.

(56) References Cited

U.S. PATENT DOCUMENTS

| | | | |
|---|---|---|---|
| 1,689,920 A | 10/1928 | Heath | |
| 3,514,811 A | 6/1970 | West | |
| 4,557,020 A | 12/1985 | Wenzel | |
| 4,613,031 A | 9/1986 | Wenzel | |
| 5,090,941 A * | 2/1992 | Dechow | ............... 452/183 |
| 5,207,610 A | 5/1993 | Ogawa | |
| 5,259,810 A | 11/1993 | Evers | |
| 5,330,383 A | 7/1994 | Ryan | |
| 5,702,295 A | 12/1997 | Ketels | |
| 5,735,735 A | 4/1998 | Hahn | |
| 6,361,426 B1 | 3/2002 | Kragh | |
| 7,044,847 B2 | 5/2006 | Ketels | |
| 7,252,584 B2 * | 8/2007 | Kragh | ............... 452/163 |

FOREIGN PATENT DOCUMENTS

DE          3608320 A1      10/1986

* cited by examiner

*Primary Examiner*—Thomas Price
(74) *Attorney, Agent, or Firm*—Christensen O'Connor Johnson Kindness PLLC

(57) ABSTRACT

An apparatus for reorienting fish fillets includes a pair of oppositely rotating turntables positioned at the end of a conveyor belt and tilted in the longitudinal direction of travel of the fillets. A divider directs fillets on the right-hand side of the conveyor to the right-hand turntable, and fillets on the left-hand side of the conveyor to the left-hand side of the turntable. A discharge guide directs the fillets carried by the turntable such that they are discharged onto the inspection table when their orientation has changed 90 degrees such that they are positioned on the inspection table transverse to the movement of the table and stomach side forward. The discharge guides extend to a location near the forward edge of the turntables and are oriented to form an opening that allows the tails of the fillets to pass under the discharge.

11 Claims, 6 Drawing Sheets

APPARATUS FOR REORIENTING FISH FILLETS DURING PROCESSING

TECHNICAL FIELD

The present invention relates to commercial fish processing apparatus which is particularly suited for being installed on processing vessels at sea, but can also be used on land, and, more particularly, to an improved device for reorienting a fish fillet received from a conveyor from a first orientation to a second orientation substantially perpendicular to said first orientation.

BACKGROUND

Fish fillets are commonly produced at sea from recently caught fish on vessels which include a processing line wherein fish are cleaned, headed, filleted, skinned, inspected, and packed at very high rates of speed, i.e., in the range of 150 fish per minute. Once the fish are placed on an infeed conveyor and oriented in a preferred direction, the processing is carried out by mechanical equipment until the fish reach the inspection and packing stage. In the past, fillets have been deposited on a so-called "candling" or backlit moving inspection table, oriented in a manner which requires their being manually reoriented and aligned for packing at the same time they are being inspected. This is both difficult and costly work. In particular, an important element of inspection of fillets is to determine if pin bones remain along the stomach side of the fillet. The present invention orients the fillets on the inspection table transverse to their paths of travel such that the fillets move stomach side forward so that the first thing an inspector sees when the fillet is moving toward him is the area where pin bones may remain.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present disclosure provides an apparatus sized and configured to receive fish filets from a conveyor, reorient them approximately 90° while they travel around the inside of the center posts of two laterally spaced turntables, and then deposit them on an inspection table. More particularly, a pair of turntables, tilted in the direction of travel of the fillets, receives the fillets from a conveyor, turns them 90°, and deposits them directly on a moving inspection table with their stomach sides forward. The reoriented fillets travel directly from the turntable to the inspection table without need of an exit chute. As the fillets move on the spinning turntable, they pass between an inner support guide and a discharge guide. The inner support guide limits the degree of travel of the fillets on the turntable. The discharge guide, which extends generally along the periphery of the turntable to a position substantially aligned with the path of travel of the fillet, extends outwardly gradually and diverges from the tilting turntable to form a triangular shaped opening between the guide and the turntable. The triangular opening allows the relatively thin trailing tail portion of a fillet to slide beneath the discharge guide when the fillet has reached a position substantially perpendicular to the longitudinal path of travel of the fillet and is deposited onto the inspection table. This design eliminates the tendency of fillets to become stuck upon the discharge chute of prior devices, does not require water to reduce friction between the fillet and the discharge chute or turntable surface, and allows the path of the fillet to be along a relatively straight line as it moves from the conveyor to the turntable where it is rotated 90°, and then deposited on to the inspection table. The fillets are deposited stomach side forward on the inspection table which makes it easier for inspectors to quickly determine if all pin bones have been removed and reduces the amount of manipulation of the fillets which the inspectors must do. Other features of the present invention will be disclosed in greater detail hereinbelow.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Fillet reorienting apparatus is disclosed, adapted to receive fillets moving on a conveyor which have exited a skinning machine, such as the Baader Model No. 52 in a fish processing line, and deposit them on a moving inspection table. The processing equipment positions the skinned fillets on the conveyor in a generally laterally spaced orientation with their head-ends forward and their stomach sides inward. In operation, as many as 150 fish per minute may be processed and, thus, any improvement in the ease of inspecting the fillets as they move with the inspection table is important, since the inspectors have little time to spend reorienting and examining each fillet.

Figure 1:
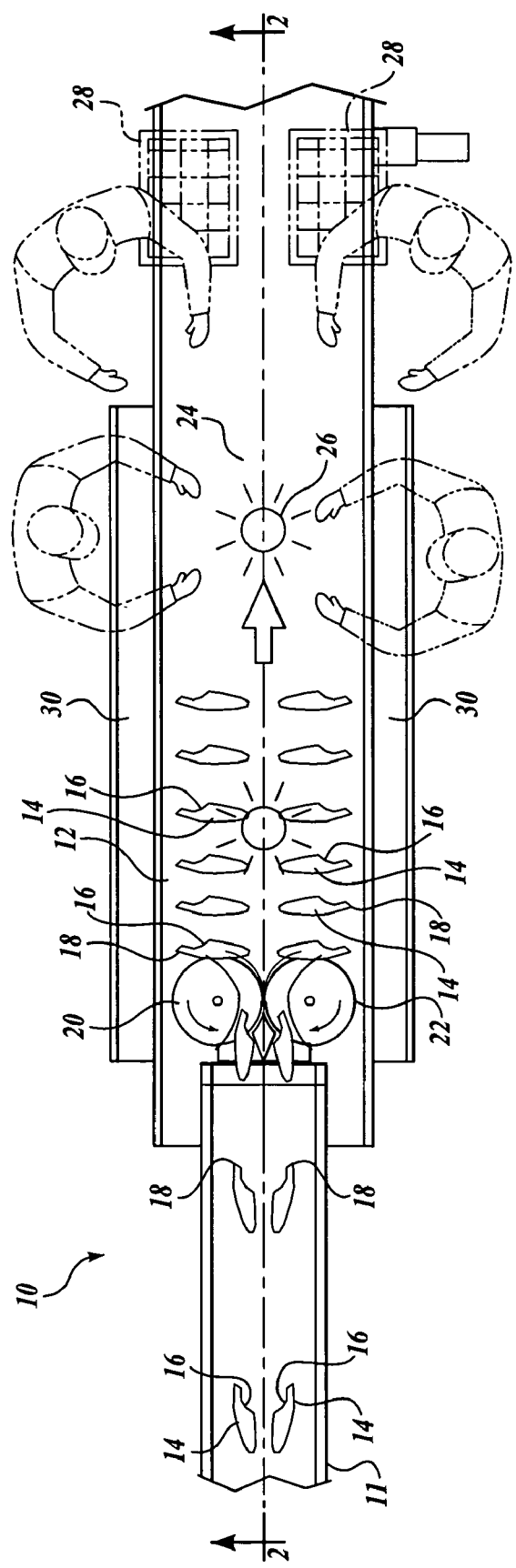
FIG. 1 is a top plan view of a portion of a fish processing line, including a delivery conveyor, fillet reorienting turntables, and an inspection table, made according to the present invention.

Referring to FIG. 1, a portion of a fish processing line 10 is disclosed to include a fillet feed conveyor 11 carrying the skinned fillets 14 which have exited a skinning machine with their stomach sides 16 facing toward each other. A principal purpose of inspection of the fillets on inspection table 12 is to determine whether all of the pin bones which the fish processing equipment is designed to remove from the stomach side of the fillet have, in fact, been removed. To facilitate this inspection, it is desirable that the fillets travel on the inspection table toward the inspectors with their stomach sides 16 facing the inspectors so that they may readily determine whether pin bones have been missed, thus allowing them to reject a fillet still containing pin bones prior to its being packed.

As discussed above, the fillets leave the skinning machine with their head ends 18 forward. Oppositely rotating turntables 20 and 22 are provided to reorient the fillets approximately 90° such that their head ends 18 are pointed outwardly, and the fillets travel on the moving inspection table with their stomach sides 16 forward. Inspection table 12 comprises a transparent conveyor which is backlit by electric bulbs 26 to make it easier for the inspectors to quickly identify flaws in the fillets prior to their being placed in containers 28 at the end of the inspection table. Trays 30 are provided on each side of the conveyor slightly below the level of the conveyor to allow the inspectors to easily slide fillets to be rejected into the trays while allowing approved fillets to move toward the containers 28.

Since the fish processing equipment is designed to operate at a high rate of speed, it will be understood that the inspectors have little time to both reorient fillets or otherwise manually manipulate them while also inspecting them. Thus, it is important that the fillets be reoriented automatically and consistently without becoming clogged on the turntables or dumped in clumps on the conveyor.

Figure 2:
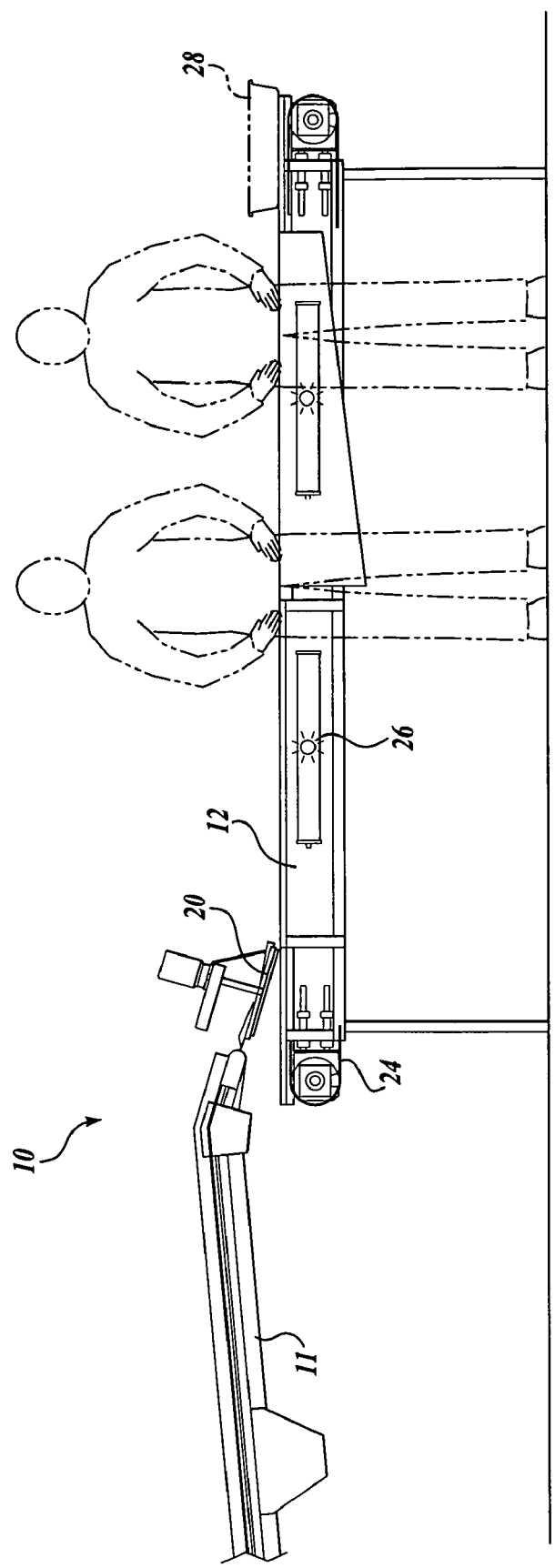
FIG. 2 is a section view taken along line 2-2 in FIG. 1.

Turning to FIG. 2, a section view of the processing apparatus 10 is disclosed. Infeed conveyor 11 can be a simple longitudinally extending conveyor which picks up the fillets as they leave the skinning machine and carries them upwardly to a position above the inspection table and then deposits them onto the downwardly extending turntables 20 and 22 where they are reoriented and deposited on inspection table 12. Turntables 20 and 22 are sloped forwardly from a higher position to a lower position in line with the longitudinal path of travel of the fillets from the infeed conveyor to the inspection table. In this way, gravity assists in the movement of the fillets across the turntable and onto the inspection table.

Inspection table 12 comprises a conveyor having a transparent belt 24 running around a pair of conventional pulleys disposed at opposite ends of the inspection table. Light sources 26 are provided to backlight the fillets as they travel on the inspection table, thus making it easier for the inspectors to identify pin bones left in the fillets or other imperfections which will cause a fillet to be rejected.

Figure 3:
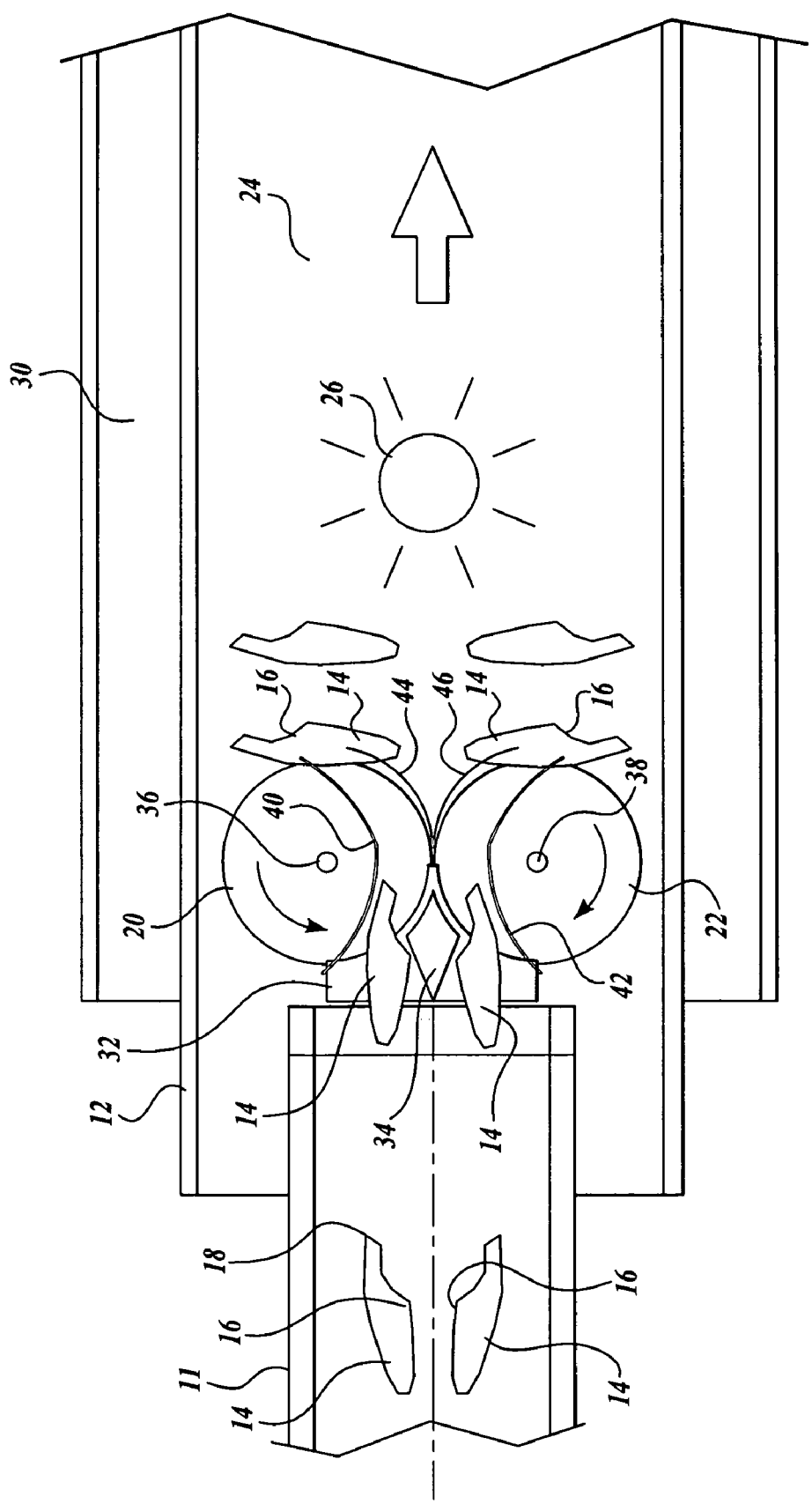
FIG. 3 is a top plan view of the conveyor, turntables, and inspection table showing a fillet sliding off of the turntable and beneath the discharge guide directly onto the inspection table in a reoriented position.

Referring now to FIG. 3, processed and skinned fillets 14 are shown traveling with their head ends 18 forward on conveyor 11 toward the inspection table 12. The stomach sides of the fillets 16 are facing each other which is the position in which they are left when they leave the fillet skinning machine. As the fillets leave the conveyor 11, they move onto an infeed chute 32 on which is mounted a dividing piece 34 which separates the fillets and directs them onto one of two paths, either to turntable 20 or to turntable 22. In the disclosed embodiment, turntable 20 is shown to rotate in a counter-clockwise direction on center shaft 36, while turntable 22 rotates in a clockwise direction on center shaft 38.

The fillets 14 are directed by dividing piece 34 onto portions of turntables 20 and 22 which are laterally inward with respect to the center shafts 36 and 38 of the turntables. The movement of the fillets is generally in line with the longitudinal direction of travel of the fillets toward the inspection table.

Referring particularly to fillet 14 directed onto turntable 20, the fillet is shown to be rotated by the turntable approximately 90° until it is substantially perpendicular to the direction of travel of the inspection belt 24 and its stomach portion faces forward. The fillet may be guided by both support guide 40 located adjacent the inner portion of turntable 20 and discharge guide 44, which as shown extends from the rear portion of dividing piece 34 substantially along the periphery of a portion of turntable 20. Discharge guide 44 is not tilted downwardly at the same angle as turntable 20 and, thus, an expanding triangular shaped opening is formed between the edge of the turntable and the bottom of discharge guide 44. This opening allows the tail end of fillet 14 to slide under the discharge guide 44 when the fillet has been turned approximately 90° from its position on conveyor 11 and is exiting the turntable and being deposited upon the belt 24 of inspection table 12.

Simultaneously, support guide 40, the bottom edge of which runs directly adjacent the top surface of turntable 20, blocks the further rotational movement of the head end of fillet 14 on the turntable. This forces the fillet to move forwardly off of the turntable and onto the inspection table. The joint action of the support guide 40 and the discharge guide 44 causes the fillets to be deposited directly from the turntable onto the inspection table in the preferred stomach-side-forward orientation so that they can be more easily and quickly inspected by the inspectors standing along the sides of the inspection table. It will be understood that a mirror image fillet reorientation movement occurs on clockwise rotating turntable 22 with the aid of the support guide 42 and discharge guide 46.

Figure 4:
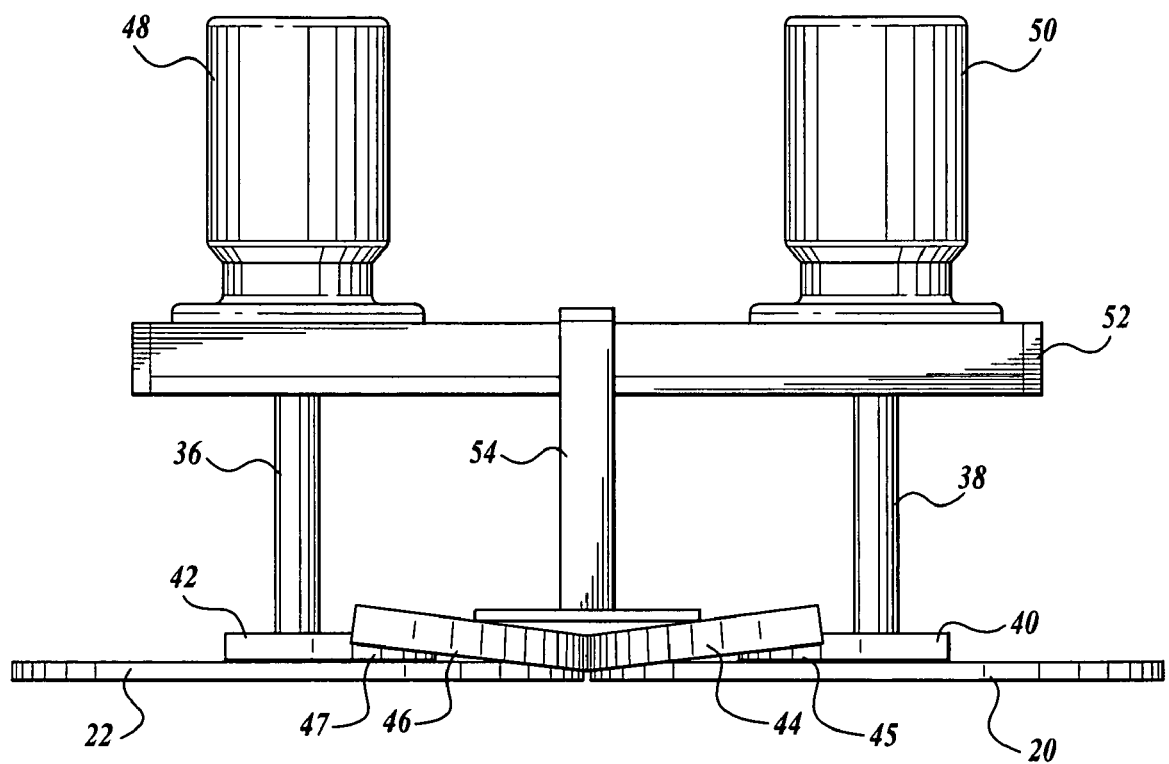
FIG. 4 is a rear elevation view of the turntables and discharge guide of FIG. 1.

FIG. 4 shows hydraulic motors 48 and 50 positioned on support frame 52. The hydraulic motors rotate turntable shafts 36 and 38 in a conventional manner. It will be understood that other types of motors, including electric controlable motors, may be satisfactorily substituted for the hydraulic motors depending upon installation conditions. In addition, the location of the motors over the products may also be modified such as by moving the motors outwardly on a laterally extended support frame and then driving the turntables through a conventional belt and hub or chain and sprocket arrangement. Support arm 54 extends from the table 52 to the discharge guides 44 and 46 mounted there below. Triangular shaped openings 45 and 47, discussed above, through which the tail portions of the fillets pass during their movement from turntables 20 and 22, may be best seen in FIG. 4.

Figure 5:
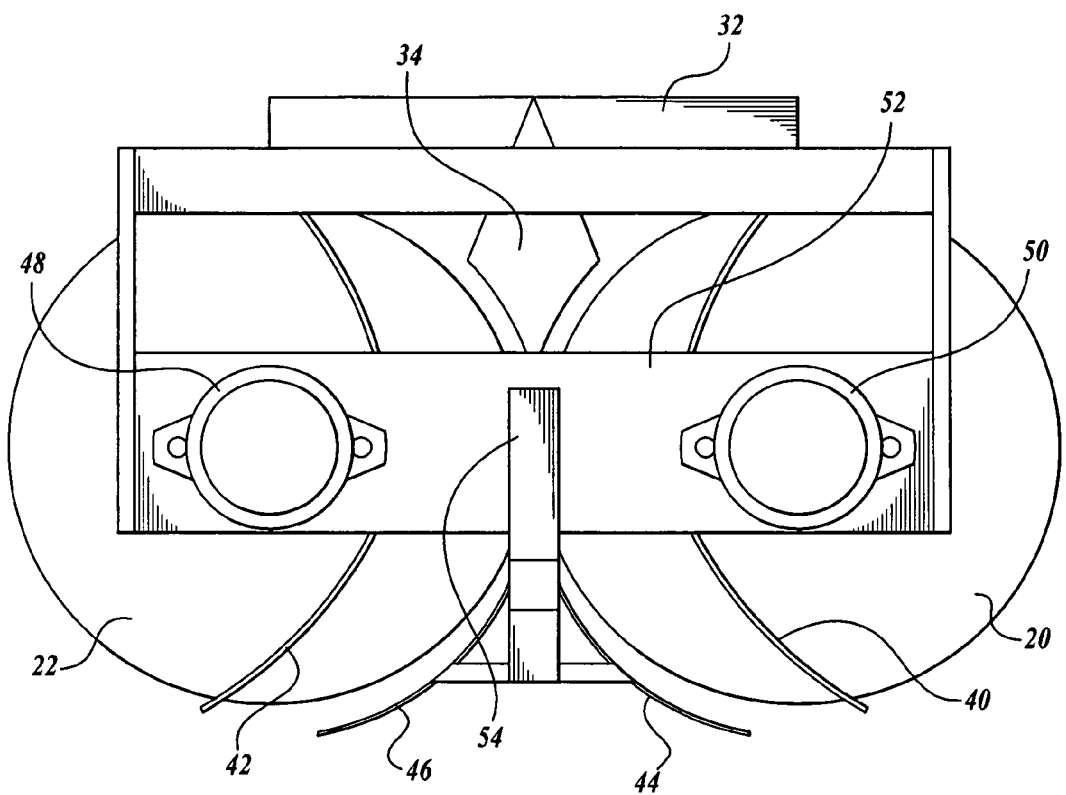
FIG. 5 is a top view of the turntables of FIG. 1.
Figure 6:
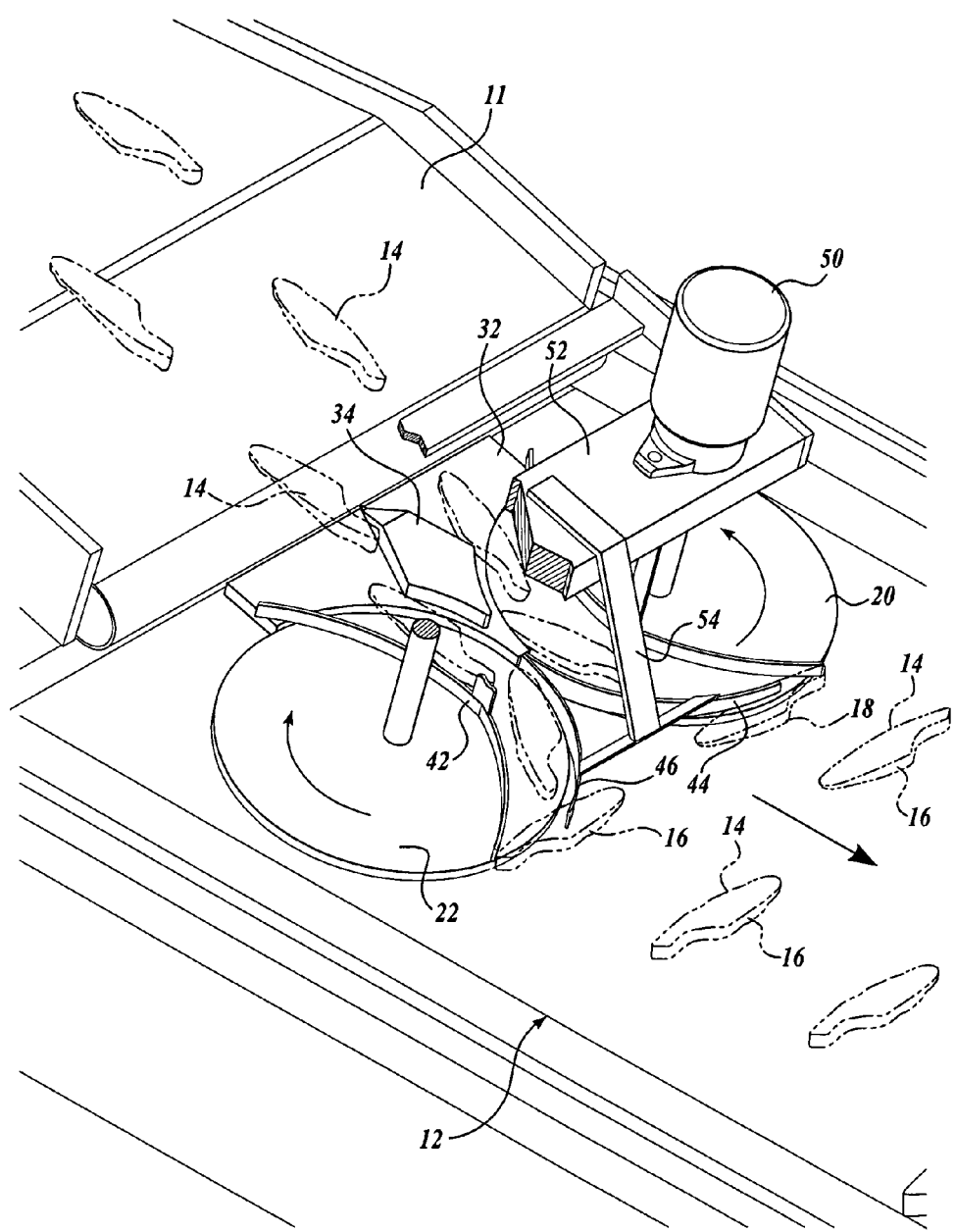
FIG. 6 is a top perspective view of the present invention with one of the turntable motors removed to show how a fillet travels when it is reoriented on the turntables.

Referring additionally to FIGS. 5 and 6, the path of travel of fillets 14 and their reorientation by turntables 20 and 22 is disclosed. Referring to the movement of fillet 14 on turntable 22, the head end of the fillet is first shown to contact dividing piece 34 which directs it toward the opening between the dividing piece 34 and the support guide 42. Turntable 22 carries the fish fillet forwardly toward inspection table 12 while at the same time causing the fillet to rotate in a clockwise direction. As the fillet is carried on turntable 22 it comes in contact with discharge guide 46 which continues the guiding and turning of the fillet to an orientation approximately 90° from that which it had when it entered the turntable. As shown in FIG. 6, when the fillet has reached an approximately 90° orientation to its longitudinal path of travel, it is substantially at the point of leaving the turntable and support guide 42 prevents its continued travel on the turntable. Simultaneously, the rear end of the fillet passes through triangular opening 47 (FIG. 4) beneath the end of discharge guide 46. It will be understood that the triangular shaped opening 47 is formed between the edge of turntable 22 and the bottom edge of discharge guide 46 as they diverge from each other. In this way, the relatively thin tail end of a fillet can slide through opening 47 beneath discharge guide 46 at the point the fillet is discharged from turntable 22. The action of the two guides and the turntable allows the fillet to be deposited directly onto the inspection conveyor 24 oriented with its stomach side 16 forward as the fillet travels toward the inspectors standing beside the inspection table.

The disclosed embodiment presents an improved method and apparatus for reorienting fish fillets traveling at high speed on a fish processing line. The apparatus not only eases the job of the inspectors who are inspecting the finished fillets, but may even allow for a reduction in the number of inspectors needed, since the amount of manipulation and manual reorientation of the fillets is significantly reduced as compared to the prior art.

While illustrative embodiments have been shown and described, it will be appreciated that various changes can be made therein without departing from the spirit and scope of the invention.

The embodiments of the invention in which an exclusive property or privilege is claimed are defined as follows:

1. An apparatus for reorienting fish fillets traveling along a longitudinal path on a conveyor, the apparatus comprising:
   a turntable positioned at an end of said conveyor to receive said fillets as the fillets leave the conveyor and to reorient the fillets such that the fillets are positioned substantially perpendicular to the path;
   a discharge guide adjacent a portion of said turntable to guide said fillets as they are reoriented from an initial orientation and to deposit the fillets on a moveable inspection table, such that the fillets are positioned substantially perpendicular to the path;
   said discharge guide having a rearward end toward said conveyor and a forward end adjacent said inspection table;
   said turntable being sloped forwardly toward said inspection table.

2. The apparatus of claim 1, wherein said discharge guide is adjacent the periphery of at least a portion of said turntable, the forward end of said guide being located generally on the longitudinal path of travel of said fillets.

3. The apparatus of claim 1, wherein the forward end of said discharge guide is spaced upwardly and outwardly from said turntable such that a portion of a fillet which has been reoriented slides under the discharge guide as the fillet is deposited on said inspection table.

4. The apparatus of claim 3, said fillet having a stomach side, wherein said fillet is deposited on said inspection table with the stomach side forward.

5. The apparatus of claim 1, further comprising an infeed chute extending downwardly from said conveyor end to said turntable.

6. The apparatus of claim 1, further comprising first and second turntables positioned laterally adjacent each other; a dividing piece positioned between said turntables and extending toward said conveyor to direct said fillets to one or the other of said turntables.

7. The apparatus of claim 6, further comprising an infeed chute extending downwardly from said conveyor end to said turntables, said dividing piece being positioned centrally thereon.

8. An apparatus for reorienting fish fillets received from a single conveyor, the apparatus comprising:
   a first turntable;
   a second turntable;
   an infeed chute positioned adjacent an end of said conveyor to direct said fillets downwardly toward said turntables;
   a dividing piece positioned adjacent a center portion of said infeed chute to direct each of said fillets to one of said first and second turntables;
   said first and second turntables rotating in opposite directions and sloping downwardly and forwardly toward a moveable inspection table;
   discharge guides adjacent a portion of the peripheries of said first and second turntables and extending to forward portions of the first and second turntables adjacent said inspection table;
   forward ends of each of said discharge guides extending gradually outwardly and upwardly with respect to one of said first and second turntables to form a space through which a tail portion of a fillet which has been rotated approximately 90 degrees may pass as the fillet is deposited on said inspection table with a stomach side forward.

9. The apparatus of claim 8, further comprising a support guide positioned radially inwardly on said first and second turntables from said discharge guide (i) to direct each of the fillets toward said discharge guide prior to the fillet being reoriented and (ii) to prevent reoriented fillets from rotating past the forward portions of said first and second turntables.

10. A method for reorienting fish fillets received from a conveyor and depositing the reoriented fillets on a moveable inspection table, the method comprising:
   (1) directing said fillets from said conveyor onto a rotating disk having a rearward portion adjacent said conveyor and a forward portion adjacent said inspection table;
   (2) rotating said fillets approximately 90 degrees such that the fillets are positioned longitudinally transverse to a direction of travel of the inspection table;
   (3) guiding said fillets to exit said rotating disc near the forward portion; and
   (4) depositing said fillets onto said moving inspection table so each of said fillets is oriented with a stomach side in a forward position.

11. The method of claim 10, wherein the step of rotating said fillets comprises the step of positioning said fillets against a discharge guide adjacent a portion of the periphery of said rotating disk; and
   wherein the step of depositing said fillets comprises the step of moving a portion of each of said fillets under the forward end of said discharge guide.

* * * * *